3,313,830
DERIVATIVES OF 1,4-DIARYLAMINOANTHRA-
QUINONE-6-SULFONIC ACID
Willy Braun, Heidelberg, and Manfred Ruske, Ludwigshafen (Rhine), Germany, assignors to Badische Anilin-& Soda-Fabrik Aktiengesellschaft, Ludwigshafen (Rhine), Germany
No Drawing. Filed June 4, 1963, Ser. No. 285,209
Claims priority, application Germany, June 6, 1962,
B 67,575
3 Claims. (Cl. 260—374)

This invention relates to new greenish blue to yellowish green 1,4 - diarylaminoanthraquinone - 6 - sulfonic acids which may be used for the production of dyes, particularly reactive dyes.

Reactive dyes, for example of the 1,4-diarylaminoanthraquinone series, are already known which are free from sulfonic acid groups in the anthraquinone nucleus and which have a green shade of color. These dyes are prepared by reaction of quinizarine with aromatic diamines free from sulfonic acid groups.

Reaction with aromatic diamines containing sulfonic acid groups is however not possible by this method. In order that the reactive dyes obtained from these reaction products of the 1,4-diarylaminoanthraquinone series, for example by acylation, may be made sufficiently water-soluble, however, it is necessary to introduce sulfonic groups into them subsequently by sulfonation. The dyes thus obtained have the disadvantage that they have low color strength.

It is an object of the invention to provide compounds which are readily accessible and which, by simple acylation with colorless acylating agents which contain a radical capable of being split off as an anion under alkaline conditions, yield uniform greenish blue to yellowish green reactive dyes of high color strength.

This object is achieved in accordance with this invention by reacting an aromatic diamine containing at least one sulfonic acid group with 1,4-dichloroanthraquinone-6-sulfonic acid which is readily accessible by pressure chlorination of anthraquinone-2-sulfonic acid in oleum. The compounds thus obtainable may readily be converted into valuable dyes by simple acylation.

Other objects of the invention will become apparent from the following description and examples.

The new anthraquinone compounds have the formula:

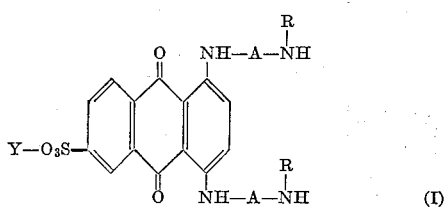

(I)

in which A is sulfophenylene, sulfotoluylene, disulfophenylene, disulfodiphenylene, dimethyldisulfodiphenylene, dimethoxydisulfodiphenylene or the radical of disulfostilbene, R denotes a hydrogen atom or an alkyl radical having one to four carbon atoms and Y denotes a proton or an alkali metal ion, particularly a sodium, potassium or ammonium ion.

The new compounds are obtained by reacting 1,4-dichloroanthraquinone-6-sulfonic acid or a salt of this acid with at least two moles of a water-soluble mononuclear or dinuclear diamine of the benzene series, one amino group of the said diamine being primary and the other amino group being primary or secondary.

These aromatic diamines may be represented by the formula $H_2N$—A—NHR (A and R having the above meanings). Examples are: 1,3-diaminobenzene-4-sulfonic acid, 1,4-diaminobenzene-2-sulfonic acid, 2,6-diaminotoluene-4-sulfonic acid, 1,4-diaminobenzene disulfonic acid, 4,4'-diaminodiphenyl-3-sulfonic acid, 4,4'-diaminodiphenyl-2,2'-disulfonic acid, 4,4'-diaminodiphenyl-3,3'-disulfonic acid, 3,3'-dimethyl-4,4'-diaminodiphenyl-disulfonic acid, 3,3'-dimethoxy-4,4'-diaminodiphenyl disulfonic acid, 4,4'-diaminostilbene-2,2'-disulfonic acid and 1-amino-4-methylaminobenzene-5-sulfonic acid.

Reaction of the 1,4-dichloroanthraquinone-6-sulfonic acid with the above-mentioned, preferably water-soluble, diamino compounds having the formula $H_2N$—A—NHR, is advantageously carried out in aqueous solution or in mixtures of water and organic solvents, advantageously in the presence of acid-binding agents and a copper catalyst such as copper powder, cuprous salts, cupric salts or copper oxide at temperatures above 50° C., preferably at 80° to 130° C.

Liquids miscible with water, such as alcohols or dioxane, are suitable as solvents. Suitable acid-binding agents are for example alkali metal carbonates and acetates, but also sodium hydroxide, potassium hydroxide and trisodium phosphate, to which if desired pyridine, N,N-dimethylformamide, or N-methylpyrrolidone may be added. The reaction period depends on the reaction temperature and may be from twelve to forty-eight hours. At temperatures above the boiling point of a solvent, working may be under superatmospheric pressure. To achieve complete conversion, it is preferable to use the aromatic diamine of the formula $H_2N$—A—NHR in excess, for example 2.1 to 5 moles per mole of the dichloroanthraquinone compound. An even greater excess of diamine is not deleterious, but is not necessary. An amount less than the 2-molar amount leads to mixtures of monosubstituted, disubstituted and unreacted compounds.

Valuable dyes are obtained from the new products by acylating them, preferably with acylating agents which contain radicals which are capable of reacting with hydroxyl groups under dyeing conditions.

Dyes having the general formula:

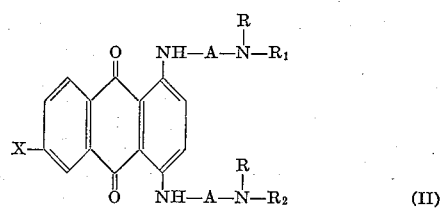

(II)

in which X denotes a sulfonic acid group or salt thereof, A denotes a radical of the benzene series at the most dinuclear and preferably bearing sulfonic acid groups, R denotes a hydrogen atom or a low molecular weight alkyl group, $R_1$ is an acyl radical and $R_2$ is an acyl radical, are thus obtained.

Those dyes having the Formula II are preferred in which $R_1$ and/or $R_2$ is an acyl radical which is capable of reacting with hydroxyl groups under dyeing conditions.

The acyl radicals $R_1$ and $R_2$ may be any organic acid radicals, for example acetyl, propionyl or benzoyl radicals, or substituted radicals, such as the 2,4-diaminotriazinyl radical. It is preferable however that at least one of the acyl radicals should be capable of reaction with hydroxyl groups. Acyl radicals which are capable of reaction with hydroxyl groups under the dyeing conditions are groups which are components of so-called reactive dyes, the principle of which is known from the chemistry of reactive dyes.

The groups may be present in reactive form, but may also have a constitution which is converted into the reactive form under dyeing conditions or during pretreatment or aftertreatment. Substituents of this type are for example those which contain a group that can be readily split off as an anion, such as a halogen atom, for example a chlorine atom or a bromine atom, or a double or triple linkage which is readily capable of addition reactions of the type of a so-called Michael addition, or are capable of farming, under the action of alkaline reacting agents, a double linkage which is readily capable of addition reactions of the type of a so-called Michael addition. Reactivity of the substituents with hydroxyl groups may also reside for example in a hydroxyl group esterified with sulfuric acid in the substituents. For example the substituents capable of reaction with hydroxyl groups may contain as reactive groups, aliphatic or aliphatic-aromatic groups having reactive radicals capable of being split off in the form of ions, such as:

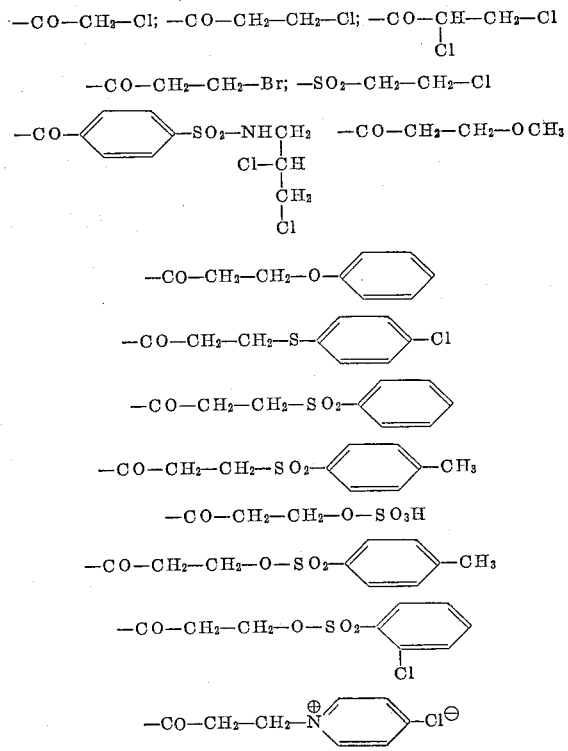

The reactive groups may also be, as already mentioned, an unsaturated aliphatic radical which is capable of addition reactions with hydroxyl groups and may also contain halogen atoms, such as:

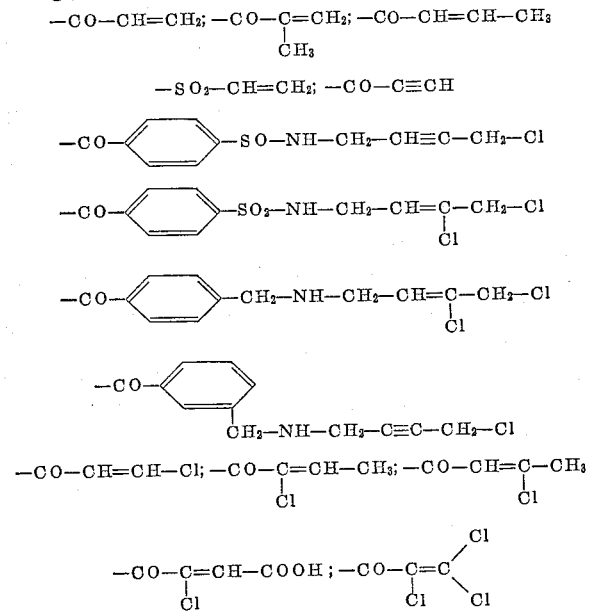

Other substituents suitable as reactive groups are for example heterocyclic six-membered rings containing two or three nitrogen atoms as hetero atoms and bearing radicals which will split off in the form of ions. Such radicals may be contained for example once, twice or three times in the heterocycle. Derivatives of cyanuric chloride which contain one or two chlorine atoms are suitable as substituents which are capable of reacting with hydroxyl groups under dyeing conditions. Instead of the second chlorine atom for example an amino, aryloxy or aryl radical may be present. These radicals occupying the position of the second chlorine atoms may in turn be substituted, for example with sulfonic acid groups. Other reactive heterocycles are for example halopyrimidines, dichloropyridazones, chlorobenzothiazoles and dichloroquinoxalines.

In addition to the said groups which react with hydroxyl groups of cellulose under alkaline conditions, there are also suitable groups which will react under acid dyeing conditions, if desired in the presence of aminoplasts, such as acyl groups containing N-methylol or N-methylene ether groups.

Acylation of the compounds according to the invention to form dyes, particularly reactive dyes, may be carried out for example in water in the presence of inorganic acid-binding agents, such as alkali metal hydroxides, carbonates or hydrogen carbonates of sodium and/or potassium, or organic acid-binding agents, for example pyridine or triethylamine, may be used. The acylating compound may be allowed to react either undiluted or with a solvent or diluent miscible with water which is inert under the conditions of the reaction, such as acetone or dioxane, with the anthraquinone compound. Readily volatile solvents which are not miscible with water, such as chloroform, are however also suitable as diluents.

The term dyeing conditions, when using dyes which are fixed on the substrate by chemical combination between the dye and the substrate, also includes conventional dyeing and printing methods which do not destroy the substrate, for example padding the dye liquor on and after treatment in an alkaline liquor, padding a weakly alkaline or neutral liquor on and steaming for a short time or storing for a long period at room temperature.

The dyes which are obtained by acylation of the products obtained according to this invention are eminently suitable for dyeing and printing material containing amido groups. Particularly with dyes obtained by acylation and which contain a reactive group, however, green to blue green dyeings and prints of good color strength and very good fastness to washing and light are obtained on native and regenerated cellulose. The material treated may be in the form of fibers, filaments, threads, flock, woven fabrics, knitted fabrics or, for example, sheets. The dyes obtained by acylation may moreover be used for dyeing and printing other materials of a great variety of types, for example sheets and films of polyvinyl alcohol or textile material of natural or synthetic linear polyamides, such as natural silk, wool, polycaprolactam or polyamides from adipic acid and hexamethylene diamine or union fabrics. The dyes are also very suitable for dyeing leather, paper, felts or non-woven fabrics of natural and/or synthetic material, such as wool, polyamides and cellulose. In addition to textile materials, sheets and films, it is also possible with the new dyes to produce good dyeings and prints on shaped articles, such as boards or rods.

The following examples illustrate the production of anthraquinone compounds obtainable according to the invention and the dyes obtainable therefrom, but the invention is not limited to these examples. The parts and percentages given in the examples are units of weight.

EXAMPLE 1

748 parts of sodium 1,4-dichloroanthraquinone sulfonate is dissolved in 5200 parts of water at 90° to 100° C., the solution is cooled to 80° C. and there are added, in portions, 1600 parts of sodium carbonate, 32 parts of copper powder, 20 parts of cuprous bromide and 1680 parts of 2,6-toluylenediamine-4-sulfonic acid. The mixture is then stirred for twenty-four hours at 80° to 85° C. and the temperature is raised to 90° to 100° C. until reaction has been completed. The reaction mixture is adjusted to pH 4 to 5 with concentrated hydrochloric acid, diluted with about 5000 parts of methanol and the deposited crystal pulp is separated from the solution at 30° to 40° C. and washed with a solution containing 49 parts of water, 49 parts of methanol and 2 parts of potassium chloride in each 100 parts until the liquid running away is colorless. After the product has been dried, about 1400 parts of 1,4-di-(2-methyl-3-amino-4-sulfoanilino)-anthraquinone-6-sulfonic acid is obtained as a dark green powder.

The dye may also be separated as the sodium, potassium or ammonium salt instead of as the free sulfonic acid.

EXAMPLE 2

364 parts of the compound obtained according to Example 1 is dissolved in 1975 parts of water at 40° to 50° C. while simultaneously adding 25% caustic soda solution and the pH value of the mixture is adjusted to 6.5 to 7.0. While mixing very well at 15° to 20° C., 326 parts of β-chloropropionyl chloride is allowed to flow in during sixty to ninety minutes and a pH value of 6 to 7 is maintained by adding 25% caustic soda solution in proportion to the consumption of the solution. The whole is stirred for another hour and a half at 15° to 20° C. and the dye precipitated by combining the reaction solution with a mixture of 1500 parts of methanol and 1500 parts of 15% potassium chloride solution, precipitation being completed if necessary by adding potassium chloride. The mixture is allowed to stand for some time and then the precipitate is filtered off with suction and washed with a solution consisting of 485 parts of water, 485 parts of methanol and 30 parts of potassium chloride. The precipitate is then washed with acetone until the liquid running away is colorless and dried at 50° to 55° C. 452 parts of a dark green powder is obtained. The reactive dye thus obtained, which contains two β-chloropropionyl groups, dyes cotton very dark bright blue green shades having very good fastness.

If cyanuric chloride, monosubstituted derivatives of cyanuric chloride, tetrachloropyrimidine or dichloroquinoxaline carboxylic chloride be used instead of β-chloropropionyl chloride, reactive dyes having similar tinctorial properties are obtained.

EXAMPLE 3

120 parts of 1,4-dichloroanthraquinone-6-sulfonic acid, 350 parts of sodium carbonate, 346 parts of benzidine disulfonic acid, 4 parts of copper powder and 3 parts of cuprous bromide are heated in 1200 parts of water to 58° to 60° C. within two hours, mixed well with stirring at 60° C. for fifteen to twenty hours and then at 80° to 90° C. until reaction is completed. The product is precipitated with concentrated hydrochloric acid, filtered off with suction and the crystal pulp washed with dilute hydrochloric acid and alcohol. The 1,4-di-(2,2'-disulfo-4'-aminodiphenylamino-(4))-anthraquinone-6-sulfonic acid thus obtained is obtained in a very good yield as a dark green powder.

Following the same procedure, 1,4-dichloroanthraquinone-6-sulfonic acid may be reacted with the following amines: 1,3-diaminobenzene-4-sulfonic acid, 1,4-diaminobenzene-2-sulfonic acid, 1,4-diaminobenzene-2,5-disulfonic acid, 1-amino-4-methylaminobenzene-5-sulfonic acid, 4,4'-diaminodiphenyl-3-sulfonic acid, 4,4'-diaminodiphenyl-3,3'-disulfonic acid, 3,3'-dimethyl-4,4'-diaminodiphenyl disulfonic acid, 3,3'-dimethyl-4,4'-diaminodiphenyl disulfonic acid, 4,4'-diaminostilbene-2,2'-disulfonic acid.

EXAMPLE 4

Acylation of the dye obtained according to Example 3, paragraph 1, with β-chloropropionyl chloride is carried out by the method described in Example 2. The reactive dye bearing two β-chloropropionyl groups is obtained in a yield of 85 to 90% of the theory. It dyes cotton in green shades having excellent fastness.

It is also possible to react the dye with the reactive components specified in Example 2 in an analogous way instead of with β-chloropropionyl chloride.

EXAMPLE 5

16 parts of the compound obtainable according to Example 1 is dissolved in 80 parts of water and the solution adjusted to pH 7 with caustic soda solution. 1.2 parts of dichloropyridazonepropionyl chloride is added to this solution at 18° to 20° C., the pH value being kept at 7.0 by adding sodium bicarbonate. The dye is precipitated by uniting the solution with 250 parts of methanol and 250 parts of 10% potassium chloride solution, filtered off with suction and washed with a solution containing 45 parts of water, 45 parts of methanol and 10 parts of potassium chloride in each 100 parts. The product is washed with acetone and dried at 50° C. A reactive dye is obtained in a good yield. It dyes cotton in dark shades having good fastness to washing.

EXAMPLE 6

21 parts of the dye obtainable according to Example 1 is suspended in 100 parts of water and the suspension adjusted to pH 7.0 with caustic soda solution. 3.9 parts of benzoyl chloride is then allowed to flow in during about ten minutes at 20° to 22° C. while stirring, the pH being kept at 7.0 with 25% caustic soda solution. The whole is stirred for another hour while keeping the pH at 7.0 and then 6.4 parts of β-chloropropionyl chloride is gradually added at 15° to 20° C. and the hydrochloric acid formed is combined with 25% caustic soda solution. The dye formed is precipitated with 300 parts of methanol and potassium chloride solution, filtered off with suction and washed with acetone. 15 parts of a blue green dye is obtained which dyes cotton green shades.

EXAMPLE 7

15 parts of the compound obtained according to Example 1 is dissolved in ten times the amount of water and at 40° C. 2 parts of 30% hydrochloric acid and 6 parts of 2-chloro-4,6-diaminotriazine-(1,3,5) are introduced. This mixture is heated to 80° C. and stirred at this temperature for five hours. The dark green precipitate is separated from the solution at 20° C. to 25° C., washed with 2% hydrochloric acid and dried. 15.7 parts of dye is obtained which can be fixed to wet fast dyeings on cotton in the presence of aminoplasts.

We claim:
1. A compound having the formula:

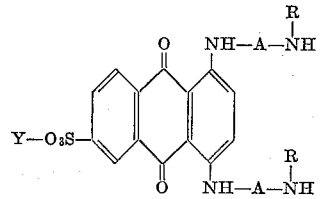

where A represents a member selected from the class consisting of sulfophenylene, sulfotoluylene, disulfophenylene, disulfodiphenylene, dimethyldisulfodiphenylene, dimethoxydisulfodiphenylene and the divalent radical of disulfostilbene, R represents a member selected from the class consisting of hydrogen and alkyl having one to four carbon atoms, and Y represents a member selected from the class consisting of hydrogen, sodium, potassium and ammonium.

2. 1,4 - di - (2-methyl-3-amino-4-sulfoanilino)-anthraquinone-6-sulfonic acid.

3. 1,4 - di-[2,2'-disulfo-4'-aminodiphenylamino-(4)]-anthraquinone-6-sulfonic acid.

References Cited by the Examiner
UNITED STATES PATENTS

| | | | |
|---|---|---|---|
| 1,901,048 | 3/1933 | Allmen | 260—374 |
| 2,891,971 | 6/1959 | Singer et al. | 260—378 X |

OTHER REFERENCES

Shibata et al.: Yûki Gôsei Kagaka Kyôkai Shi, vol. 17, pp. 148–153 (1959).

LORRAINE A. WEINBERGER, *Primary Examiner.*

RICHARD K. JACKSON, *Examiner.*

H. C. WEGNER, *Assistant Examiner.*